United States Patent
Bergman et al.

(10) Patent No.: US 8,681,720 B2
(45) Date of Patent: Mar. 25, 2014

(54) METHODS AND DEVICES FOR MULTIPLE MODULATED DATA STREAMS SIGNALING

(75) Inventors: Johan Bergman, Stockholm (SE); Dirk Gerstenberger, Stockholm (SE); Bo Göransson, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 463 days.

(21) Appl. No.: 12/934,530

(22) PCT Filed: Mar. 25, 2008

(86) PCT No.: PCT/SE2008/050328
§ 371 (c)(1),
(2), (4) Date: Dec. 26, 2010

(87) PCT Pub. No.: WO2009/120118
PCT Pub. Date: Oct. 1, 2009

(65) Prior Publication Data
US 2011/0096727 A1    Apr. 28, 2011

(51) Int. Cl.
*H04W 4/00*    (2009.01)

(52) U.S. Cl.
USPC .......................................... 370/329; 370/328

(58) Field of Classification Search
USPC ......... 370/229, 230, 235, 252, 310, 328, 331, 370/329, 338, 466, 493, 335, 342, 349; 709/220, 233, 224; 455/69, 422.1; 375/259, 295
See application file for complete search history.

(56) References Cited

U.S. PATENT DOCUMENTS

2006/0072514 A1*  4/2006  Kent et al. .................... 370/335
2007/0002812 A1*  1/2007  Malkamaki et al. .......... 370/338
2007/0274253 A1   11/2007  Zhang et al.
2008/0056229 A1*  3/2008  Gholmieh et al. ............ 370/349
2008/0086669 A1*  4/2008  Cheng et al. .................. 714/748
2008/0175203 A1*  7/2008  Jen .................................. 370/331
2010/0234011 A1*  9/2010  Baker et al. ................. 455/422.1
2010/0316159 A1* 12/2010  Bo et al. ........................ 375/295

FOREIGN PATENT DOCUMENTS

| EP | 1555761 A1 | 7/2005 |
| EP | 1850524 A1 | 10/2007 |
| EP | 1879317 A1 | 1/2008 |
| WO | 2004/034615 A1 | 4/2004 |
| WO | 2007/021159 A2 | 2/2007 |
| WO | 2008/004924 A1 | 1/2008 |

OTHER PUBLICATIONS

Sweden Patent Office, Int'l Search Report in PCT/SE2008/050328, Jan. 30, 2009.
Sweden Patent Office, Int'l Preliminary Report on Patentability in PCT/SE2008/050328, Jan. 30, 2009.
Sundaresan et al., On the Use of Smart Antennas in Multi-Hop Wireless Networks, Trans. on Mobile Computing, Dec. 2011, pp. 1666-1680, vol. 10, issue 12, IEEE.
Luo et al., Fuction Reallocation and Signalling Support for Future Network Evolution, Proceeding of the SDR 05 Technical Conference and Product Exposition, 2005, pp. 1-6, SDR Forum.

* cited by examiner

*Primary Examiner* — Abdullah Riyami
(74) *Attorney, Agent, or Firm* — Potomac Patent Group PLLC

(57) ABSTRACT

Embodiments relate to a base station (10) arranged to order a mode of multiple modulated data streams communication of a user equipment (20) in a communications network, comprising transmitting arrangement (141a-141i), receiving arrangement (143a-143j) and a control unit (17, 12, 16) arranged to determine a mode of multiple modulated data streams communication of the user equipment based on a parameter relating to a capacity of the communications network, and to transmit over the transmitting arrangement (141a-141i) an order to the user equipment indicating the determined mode of multiple modulated data streams communication of the user equipment.

20 Claims, 6 Drawing Sheets

METHODS AND DEVICES FOR MULTIPLE MODULATED DATA STREAMS SIGNALING

TECHNICAL FIELD

The present invention relates to methods and communication devices, especially, a base station arranged to transmit data concerning mode of communication of a user equipment.

BACKGROUND

In the field of transmitting data it has been developed a number of techniques to increase the data rate during transmissions. One technique is to use multiple modulated data streams. A technique called Multiple Input Multiple Output (MIMO) has been defined in WCDMA, Wideband Code Division Multiple Access, Rel-7 to enable higher data rates in downlink as well as uplink. As an example, the peak rate of HSPA, High Speed Packet Access, has been doubled with MIMO compared to earlier releases. In HSPA, MIMO is supported, as an optional feature, by certain categories of User Equipment, UE. User equipment may be any wireless communications device such as mobile phone, PDA, smart phone, laptop, or the like. A MIMO function enables usage of multiple transmit antennas and multiple receive antennas increasing the rate of transmission. For MIMO capable terminals, the MIMO function can be turned on/off by the control element of the network, such as an RNC, Radio Network Controller, or the like; that is, the user equipment is set in a so-called MIMO mode by the RNC.

To support DL MIMO, control channels in uplink, UL, and downlink, DL, have been modified accordingly. The DL HS-SCCH, High Speed—Shared Control Channel, has been extended to incorporate the necessary information for transmitting up to two transport blocks simultaneously. Similarly, the UL control channel, HS-DPCCH, High Speed—Dedicated Physical Control Channel has been extended to incorporate CQIs, Channel Quality Indicator, for up to two "streams" in addition to precoding information. Hence, the payload in the control channels is increased, and due to the increased payload in the MIMO control channels, the coverage for a terminal in MIMO mode is somewhat smaller than for a corresponding terminal not in MIMO mode. Alternatively, more power is needed for control channels to retain the same coverage when a terminal is entering MIMO mode.

Each MIMO capable user equipment may be put into MIMO mode by higher layer signaling. Thus, the RNC can send a MIMO on/off message to the user equipment and base station. This command may be sent at any time, but is mostly foreseen at call setup, cell changes or the like. The base station may then start using the MIMO HS-SCCH and then transmit on the HS-PDSCH, High Speed—Physical Downlink Shared Channel, in MIMO mode. As the RNC transmits the MIMO command an activation time is set based on an estimated time on how long it will take the MIMO command to reach both the base station and the user equipment. The RNC has no continuous feedback from the base station or the user equipment and is not responding to multiple modulated data streams capacity changes within the network.

SUMMARY

An object with embodiments is to provide a more efficient use of the multiple modulated data streams function in a communications network.

In an aspect a base station is arranged to order a user equipment in a communications network to operate in a mode of multiple modulated data streams communication, comprising a transmitting arrangement and a control unit arranged to determine a mode of multiple modulated data streams communication of the user equipment based on a parameter relating to a capacity of the communications network, and to transmit an order to the user equipment indicating the determined mode of multiple modulated data streams communication of the user equipment using the transmitting arrangement.

In an aspect a user equipment is provided comprising a receiving arrangement configured to receive an order from a base station, wherein the order comprises an indication of a mode of multiple modulated data streams communication, and a control unit arranged to configure the user equipment to operate in the mode of multiple modulated data streams communication indicated in the received order.

In an aspect a method in a base station in a communications network is disclosed for ordering a mode of multiple modulated data streams communication of a user equipment within the communications network comprising the steps of: determining a mode of multiple modulated data streams communication of the user equipment based on a parameter relating to the capacity of the communications network, and transmitting an order to user equipment indicating the determined mode of multiple modulated data streams communication.

In an aspect a method in a user equipment in a communications network is disclosed comprising the steps of: receiving an order indicating a mode of multiple modulated data streams communication, and configuring the user equipment to operate in the indicated mode of multiple modulated data streams communication.

In an aspect a base station arranged to provide connections to terminals within a certain area is provided with means for generating commands to order MIMO settings in terminals within an area of the base station. If a user equipment has been reporting poor channel conditions to base station via the CQIs, which results in a single stream transmission making the MIMO function indisposable, it would be beneficial to switch MIMO off to save resources for other users. Similarly, if the channel rank of a channel changes, for example, from supporting two data streams to one data stream, it may be desired to issue a MIMO off command. As these parameters are known in the base station, for example a NodeB, the base station controls the MIMO settings in the user equipment by sending orders to the user equipment.

Furthermore, a layer one control signal packet is disclosed containing at least a first bit indicating that the packet contains an order indicating a mode of multiple modulated data streams transmission, and at least a second bit indicating the mode of multiple modulated data streams transmission.

BRIEF DESCRIPTION OF THE DRAWINGS

Embodiments will now be described in more detail in relation to the enclosed drawings, in which.

DETAILED DESCRIPTION OF EMBODIMENTS

Figure 1:
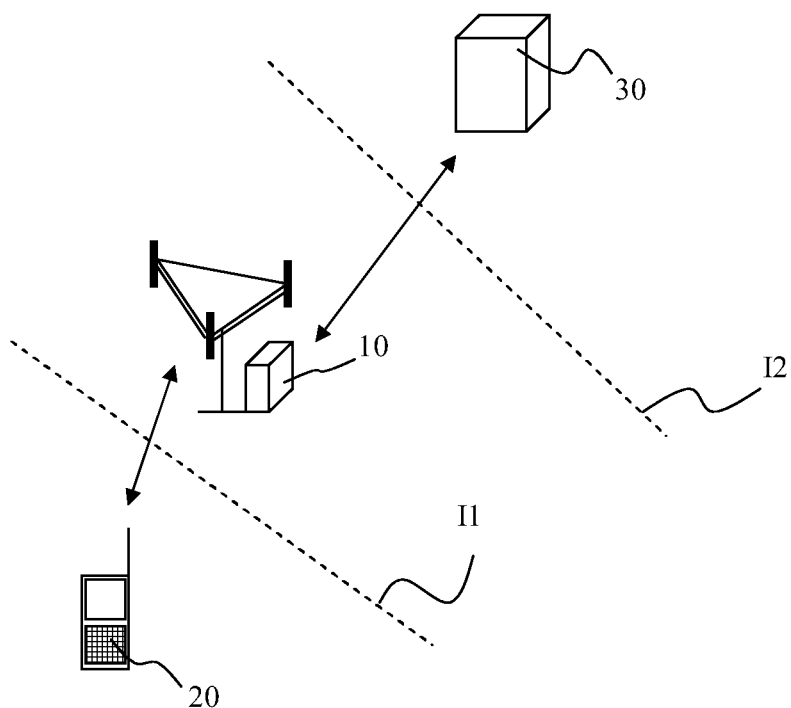
FIG. 1 shows a schematic overview of a wireless communications system.

In reference to the figures and description a MIMO system is illustrated. It should, however, be noted that embodiments disclosing any kind of device capable of receiving and/or transmitting multiple modulated data streams would also be possible, such as multi carrier systems or the like.

The present invention now will be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the term "comprising" or "comprises" is open-ended, and includes one or more stated features, integers, elements, steps, components or functions but does not preclude the presence or addition of one or more other features, integers, elements, steps, components, functions or groups thereof.

As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Well-known functions or constructions may not be described in detail for brevity and/or clarity.

Embodiments according to the present invention are described with reference to block diagrams and/or operational illustrations of methods and communication terminals. In this regard, each block may represent a module, segment, or portion of code, which comprises one or more executable instructions for implementing the specified logical function(s). It is to be understood that each block of the block diagrams and/or operational illustrations, and combinations of blocks in the block diagrams and/or operational illustrations, can be implemented by radio frequency, analog and/or digital hardware, and/or program instructions. These program instructions may be provided to a control unit, which may include one or more general purpose processors, special purpose processors, ASICs, and/or other programmable data processing apparatus, such that the instructions, which execute via the controller and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language and/or a lower level assembler language. It will be further appreciated that the functionality of any or all of the program modules may also be implemented using discrete hardware components, one or more application specific integrated circuits (ASICs), or a programmed digital signal processor or microcontroller. As used herein, "electronic component" means an active device as contrasted with a passive electrical connector or the like. An electronic component may include a processor.

As used herein, a "user equipment" includes, but is not limited to, a terminal that is configured to receive/transmit communication via a wireless interface with, for example, a cellular network, a satellite network, a wireless local area network (WLAN), and/or another user equipment.

Other examples/synonyms of user equipment may be "wireless communication terminal" or a "wireless terminal." Examples of wireless terminals include, but are not limited to, a cellular telephone, personal data assistant (PDA), pager, and/or a computer that is configured to communicate data over a wireless communication interface that can include a cellular telephone interface, a Bluetooth interface, a wireless local area network interface (e.g., 802.11), another RF communication interface, and/or an optical/infra-red communication interface.

As used herein user equipment may be portable, transportable, installed in a vehicle (aeronautical, maritime, or land-based), or situated and/or configured to operate locally and/or in a distributed fashion at any other location(s) on earth and/or in space.

FIG. 1 shows a schematic overview of a wireless communications system comprising MIMO capable devices. A base station 10 may be arranged to signal directly to user equipment 20 whether MIMO should be turned on or off for the user equipment. This may be done by introducing physical layer signaling between the base station 10 and the user equipment 20 where the base station 10 orders the user equipment 20 to activate/deactivate some or all MIMO related features. By omitting control of switching of MIMO mode and features in a control node 30, such as RNC, BSC, base station controller or the like, the flexibility of the switching between modes may be improved as well as use of network resources. The user equipment 20 will be utilizing the resources of the MIMO mode in a more efficient manner, using the more capacity demanding MIMO control channel signaling when capacity of the MIMO mode is useful and not using the MIMO control channel signaling when MIMO mode is not useful. In addition, traffic over a second interface 12, such as Iub-interface or the like, may be slightly reduced.

It should be understood that the base station may be a NodeB, RBS (radio base station), eNB (evolved Node B) or the like.

The MIMO technique uses a number of special channels. HS-SCCH is a downlink channel for carrying signaling for HS-DSCH. HS-DSCH is a downlink channel for carrying packets for different terminals, and HS-DPCCH is an uplink channel for carrying feedback for downlink transmissions. The HS-SCCH is used to signal which user is scheduled to receive a HS-DSCH in a transmission time interval, TTI. The HS-SCCH also signals transport format information and information related to hybrid automatic repeat request, HARQ, for the TTI. The HS-DSCH is transmitted with a delay of two time slots from the HS-SCCH, carrying data, and HS-DPCCH is transmitted carrying HARQ ACK/NACK, CQI or other channel information.

The base station 10 is enabled to order the user equipment 20 directly via layer 1 signaling to activate/deactivate some or all MIMO related features for each MIMO capable user equipment residing in a MIMO capable cell.

The orders are sent via an air interface I1, such as Uu or Um interface, from the base station directly to the user equipment via the HS-SCCH channel.

Base station 10 may be arranged to determine appropriate MIMO mode of the user equipment 20 based on a number of parameters relating to the capacity in the network, for example, indicated from/of the user equipment such as radio propagation conditions; CQI reports, channel rank estimates, Signal to Interference and Noise Ratio, SINR, estimates and/or Transmit Power Control, TPC, commands which are to control each others transmit power. For example, in an embodiment the determination criterion could be based on comparisons of one or more parameters with predefined or configurable threshold values. Furthermore, the base station 10 may determine MIMO mode based on parameters from the network, such as incoming load or the like, and/or the resource situation of the base station, such as buffer status, resource usage, internal damaged units or the like.

In order to achieve a robust performance, once the user equipment 20 is ordered by the base station 10 to change to MIMO mode and/or activate/deactivate some or all of its MIMO related features, the user equipment 20 may acknowledge the order via L1/L2 signaling to the base station, for example, sending an ACK-message and/or a special CQI value via the HS-DPCCH channel. Uplink High Speed-Dedicated Physical Control Channel carries acknowledgment information and current channel quality indicator (CQI) of the user. This value may then be used by the base station 10 to update the MIMO mode of the user equipment 20.

By letting the base station 10 control the MIMO mode of the user equipment 20 the use of the MIMO mode control channel that utilizes more bandwidth than a different control channel is optimized. That is, the MIMO control channel is just or substantially used when the MIMO function is useful.

The HS-SCCH orders are expected to have a low false detection probability so that the number of undesired switches of MIMO mode due to the user equipment erroneously detecting an HS-SCCH order will be insignificant. However, as a protection against this error event, the base station may be arranged to detect the format of the MIMO related feedback channel from the user equipment (HS-DPCCH). If the format is estimated to be the format of a different MIMO mode than the one currently used by the base station, the base station could transmit an HS-SCCH order to the user equipment to change the mode of the user equipment to the correct MIMO mode. Or, as an alternative, the base station could transmit HS-SCCH orders periodically to make sure that the user equipment stays in the correct mode.

Figure 2:
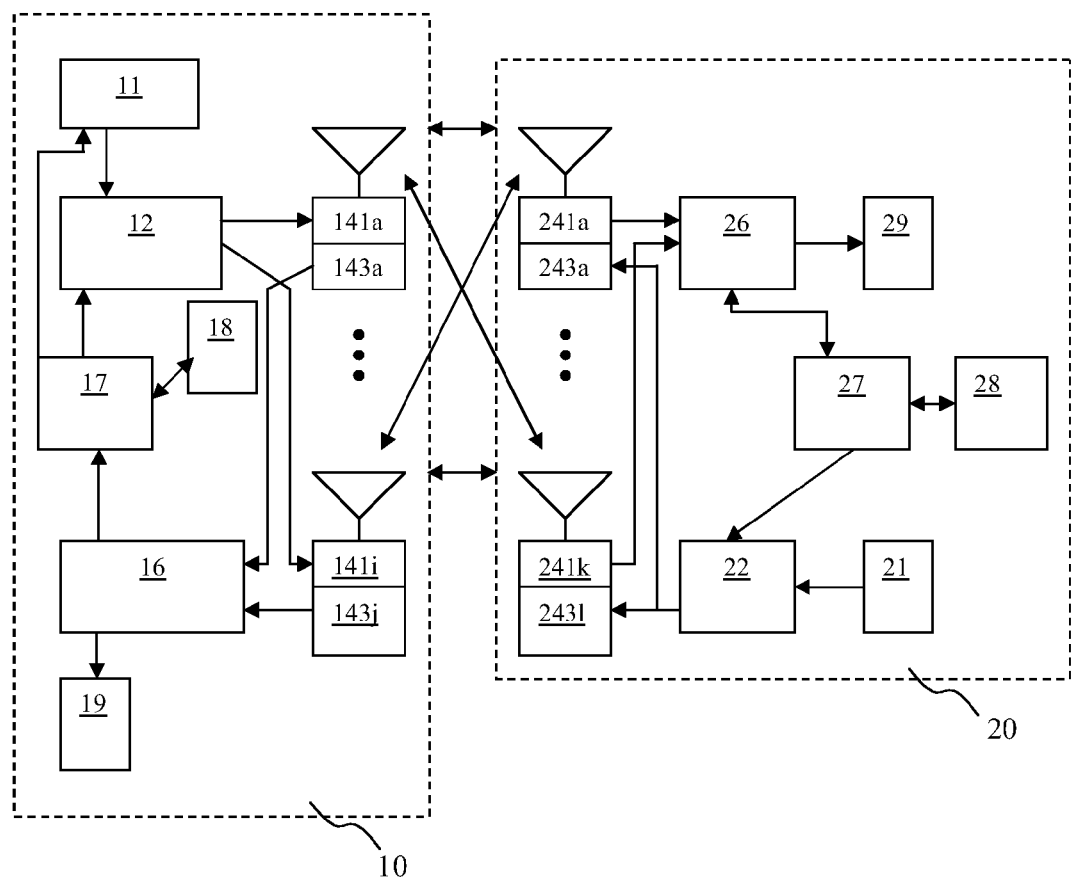
FIG. 2 shows a schematic over view of a base station and a user equipment.

In FIG. 2, a schematic overview of a base station 10 and a user equipment 20 is shown. The base station comprises a data input 11, and a transmission processor 12 that receives data from the data input 11 and processes the data into transmittable data over different transmitters. The transmission processor 12 may demultiplex data, signaling and pilot symbols into multiple streams and these are fed to a plurality of transmitters $141a$-$141i$ in accordance with a set MIMO-mode. The base station further comprises a number of receivers $143a$-$143j$ arranged to receive data from user equipment. The received data is transferred to a receiving processor arrangement 16 configured to detect the MIMO mode of the received signal and to recover feedback information and traffic data sent by user equipment 20. The received data is further provided to a data sink 19, for further processing of the data in any desired manner. A control unit 17 is also arranged to control the different devices within the base station with a memory 18 comprising program code stored thereon. The control unit 17 is arranged to determine based on parameters received from RNC, user equipment or internally the appropriate MIMO mode for the user equipment. Parameters may be received from the receiving processor arrangement 16, the data input 11 or the like. The control unit then creates a control packet comprising an order on what MIMO mode the user equipment should run.

The user equipment 20 comprises a data input 21 containing data to be transmitted by processing the data in a transmission processor 22. The data is modulated and split up in accordance with a MIMO-mode and transferred to a plurality of transmitters $243a$-$243k$. It should also be noted that the user equipment may send feedback information, such as ACK/NACK, CQI, and/or so on, to the base station. The feedback data is processed in the transmission processor and sent back using the transmitters $243a$-$243k$. The data from the base station 10 is received at a number of receivers $241a$-$241l$ and transferred to a receiving processor arrangement 26 configured to estimate the channel response based on a received pilot and provides a channel estimate, the receiving processor arrangement further detects the MIMO function of the received data and is arranged to further process, such as descramble, despread, decode etc, the received data to a data sink 29. The user equipment further comprises a control unit 27 arranged to control the operation of the user equipment 20. In addition, a memory 28 containing program code is disclosed connected to the control unit.

As the user equipment receives the control packet containing the order from the base station the UE control unit 27 executes the order to run in the determined MIMO mode and transmits an acknowledgement in the feedback packet. In addition, CQI based on estimations and the likes from the receiving processor arrangement 26 is also included into the feedback packet.

The base station may then in the receiving processor arrangement 16 determine the present MIMO mode from the feedback packet and the control unit 17 may compare the present MIMO mode with the determined MIMO mode and based on the comparison transmit or not transmit a new order. Furthermore, the control unit 17 may analyze the feedback information from the user equipment to determine if the present MIMO mode is the most efficient one utilizing the resources in an optimal manner.

Figure 3:
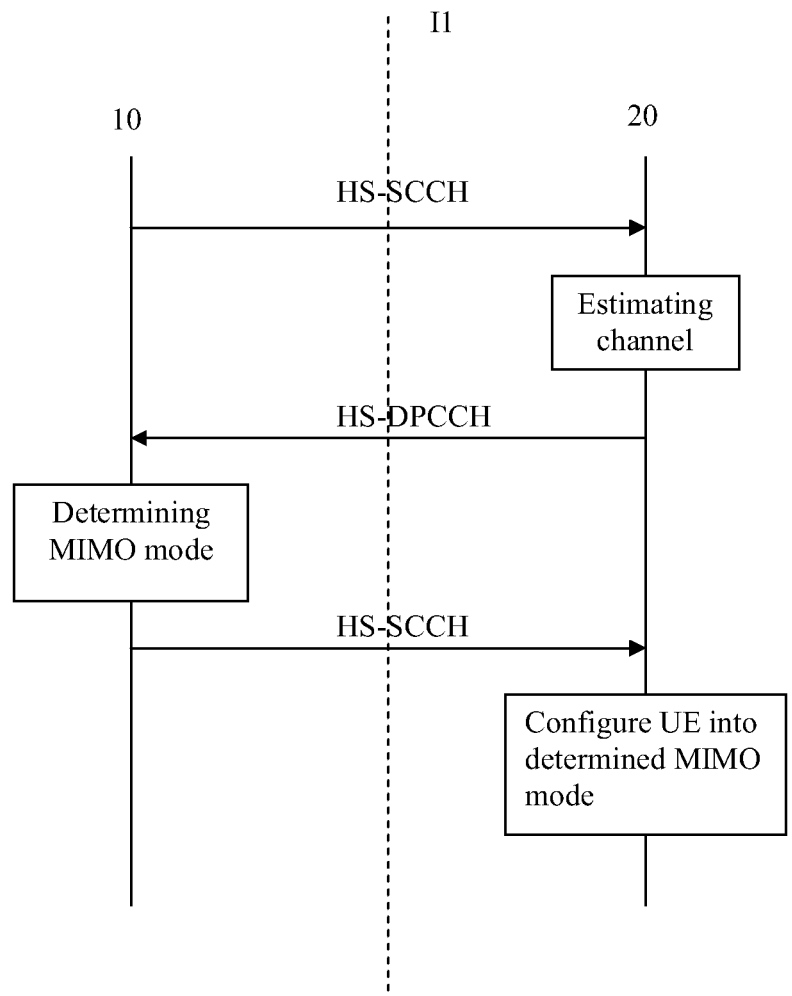
FIG. 3 shows a schematic signaling scheme of a method in a communications network.

In FIG. 3 a schematic signaling scheme is illustrated. The base station transmits control information over layer 1 signaling, HS-SCCH, and any other downlink channels such as Common Pilot Channel, CPICH, to the user equipment UE.

The user equipment performs a channel estimation of the downlink channel and sends feedback such as the channel quality indicator over HS-DPCCH and any other uplink channels such as DPCCH, to the base station.

The base station analyses the feedback from the user equipment and determines a MIMO mode for the user equipment based on, for example, the channel quality indicator.

The base station sends over an order comprising an indicator that the user equipment should be set in the determined MIMO mode.

The user equipment receives the order and changes over to the determined MIMO mode.

By using a concept not to use the multiple modulated data streams control signaling if the probability of dual stream transmission is very low, the required DL power will be reduced and generated UL interference will be less. Note that the same throughput will be achieved in one stream MIMO mode as in non-MIMO mode, but to a higher overhead cost.

Figure 4A:
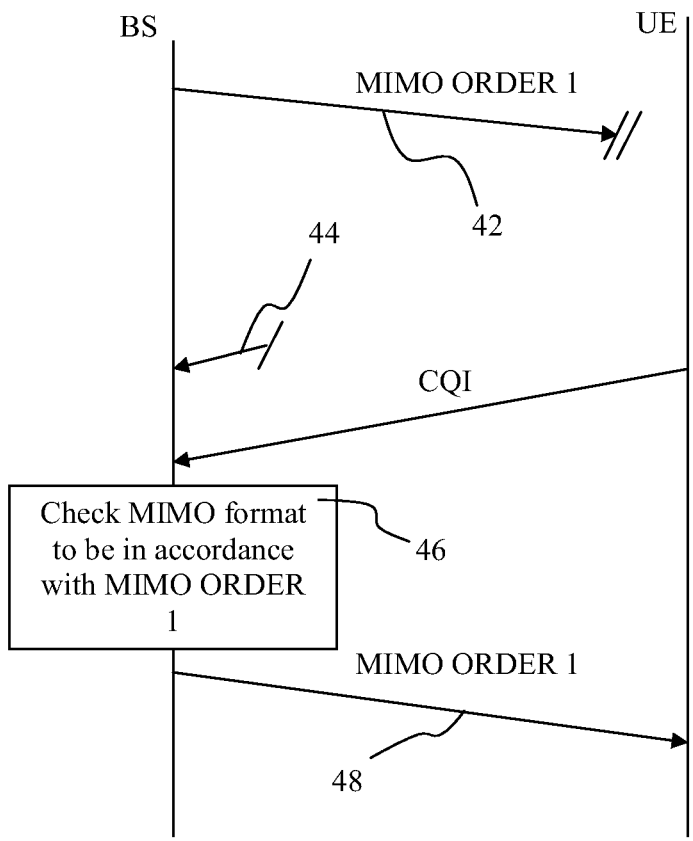
FIGS. 4a-4b show schematic signaling schemes of embodiments.
Figure 4B:
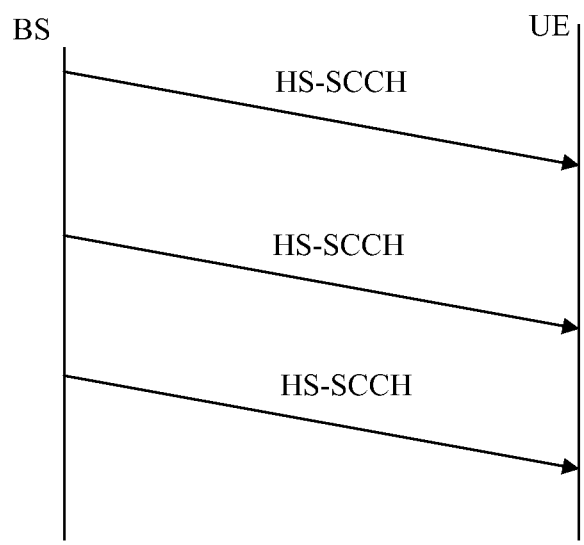

In FIG. 4a a schematic overview of a signaling scheme in an embodiment is shown. A base station, BS, may determine that an HS-SCCH order, denoted as step 42, transmitted by base station is not detected by the user equipment, UE, by not receiving an acknowledgement from the user equipment on HS-DPCCH. Furthermore, base station may erroneously detect an acknowledgement, denoted step 44, although the user equipment has not transmitted an acknowledgement. If these two events occur at the same time, that is, the user equipment has not received orders and the base station has received an erroneous acknowledgement, the base station and the user equipment will end up in different MIMO modes. This can be solved similarly as described above, that is, the base station is arranged to detect a MIMO format indicated in the feedback channel from the user equipment (HS-DPCCH), step 46, and sends another HS-SCCH order to make the user equipment change to the correct mode if necessary, step 48. Another possible solution, shown in FIG. 4b, is to send several identical HS-SCCH orders in series to the user equipment to increase the possibility that the user equipment detects the HS-SCCH order correctly. In embodiments, this may be done for all user equipments or only for user equipments that experience bad channel conditions according to, for example, the channel quality indicator (CQI) and/or SINR transmitted from the user equipment.

Figure 5:
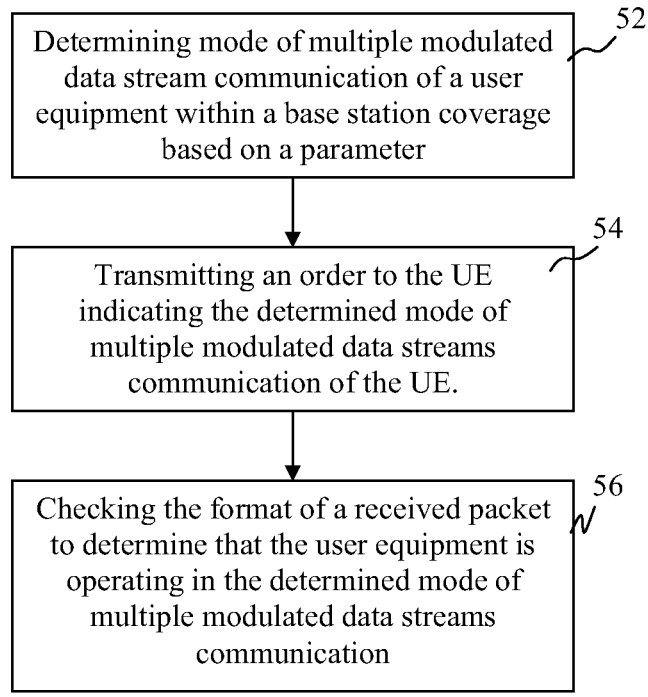
FIG. 5 shows a schematic flowchart of a method in a base station arranged to control the multiple modulated data streams mode of a user equipment.

FIG. 5 shows a schematic flow chart of a process in a base station of giving an order of a mode of multiple modulated data streams communication from a base station to user equipment.

In step 52, the base station, BS, determines the multiple modulated data streams mode of the user equipment within a base station coverage. The decision is based on at least one parameter, such as feedback information from the user equipment indicating radio propagation conditions, other data transmitted from the user equipment wherein the base station may perform a channel estimation based on that other data, load of the base station from the network or internal buffer status, or anything else relating to the capacity of the network, such as the capacity of the base station, the user equipment, other equipment, channels or the like.

In step 54, the base station transmits an order containing an indication of the determined mode of multiple modulated data streams communication of the user equipment. An indication that is used by the user equipment to change/keep the mode of multiple modulated data streams communication.

As an optional step 56, the base station may check the format in a received acknowledgement indicating the present mode of multiple modulated data streams communication to determine that the user equipment is in the determined mode of multiple modulated data stream communication.

Figure 6:
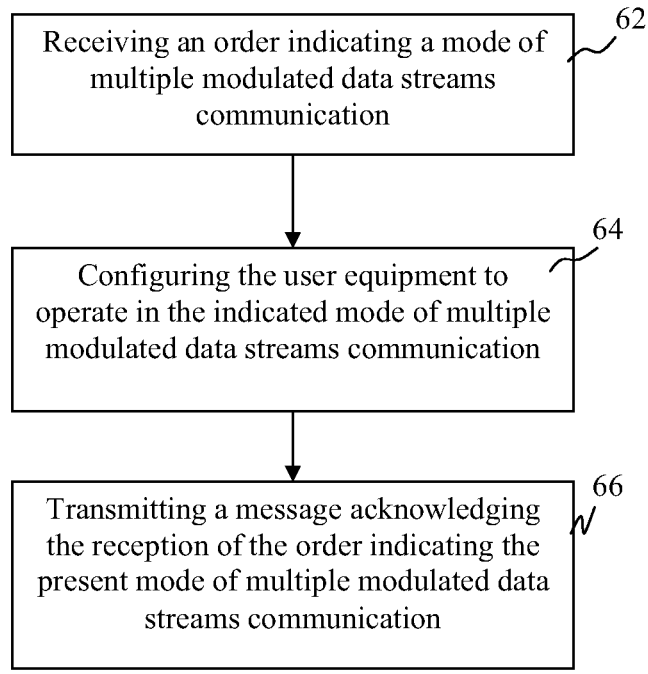
FIG. 6 shows a schematic flowchart of a method in a user equipment receiving an order from a base station.

In FIG. 6 a method in a user equipment is disclosed.

In step 62, the user equipment receives an order indicating a mode of multiple modulated data streams communication from a base station in a, for example, control signalling packet.

In step 64, the user equipment is configured to operate in the indicated mode of multiple modulated data streams communication.

As an optional step, step 66, the user equipment may further transmit a message acknowledging the reception of the order indicating the present mode of multiple modulated data streams communication.

It should be understood that the process may be used to optimize the multiple modulated data streams uplink wherein the uplink quality is evaluated instead of the downlink and that the multiple modulated data streams communication may be MIMO feature, multi carrier feature and/or the like.

Figure 7:
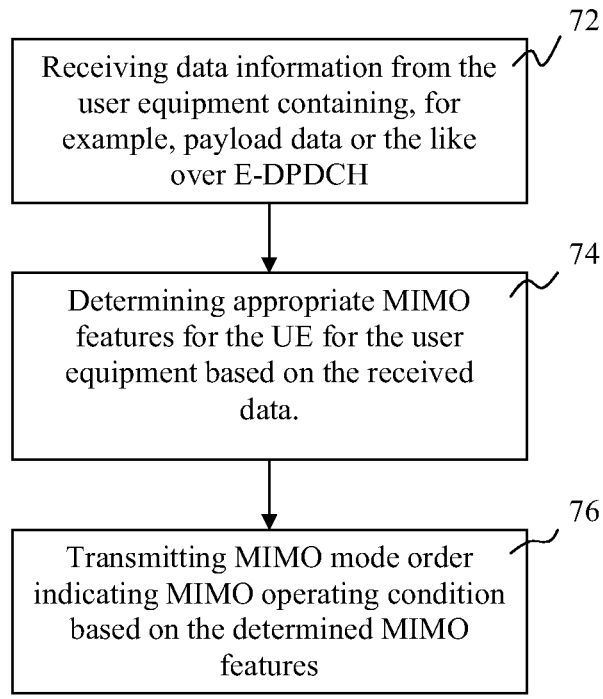
FIG. 7 shows a schematic flowchart of a method in an uplink scenario.

In FIG. 7, an embodiment disclosing a schematic overview of a base station instructing a MIMO capable user equipment on an uplink basis.

In step 72, the base station, BS, receives data information from the user equipment containing, for example, payload data or the like over an E-DPDCH, Enhanced Dedicated Physical Data Channel and physical control information over DPCCH and E-DPCCH.

In step 74, the base station determines appropriate MIMO features for the user equipment based on the received transmission. Base station may base its orders on parameters, for example, channel rank estimates, SINR estimates, output power levels or any other direct or indirect indicators of the usefulness of MIMO for the user equipment in question, determined/calculated/estimated in the base station.

In step 76, the base station transmits MIMO orders over, for example, HS-SCCH or the like, to the user equipment indicating MIMO settings for the user equipment.

The order may be sent as one bit in the control signaling indicating MIMO on or off or a number of bits enabling the possibility of indicating a plurality of possible MIMO modes.

It should be understood that evaluation of the determination criteria may be executed in different ways, such as continuously, periodically with a predefined or configured period, or when some other internal base station condition is fulfilled, for example, detection of a resource shortage in base station, or when control signaling from controller unit, such as RNC or the like, to the base station indicates that the evaluation should take place, if such control signaling is introduced.

An advantage of embodiments is that the user equipment in the network will be able to operate in the most appropriate mode to a larger extent, for example, the user equipment may operate in MIMO mode only in scenarios where MIMO operation is useful when taking, for example, propagation conditions and output power limitations into account.

Furthermore, the user equipment may just operate in non-MIMO mode in scenarios when MIMO operation is not useful, resulting in less required control channel overhead (in uplink and downlink), which will give advantages in terms of coverage and/or capacity. For example, as a channel estimation results in a channel rank of one, which means that the MIMO-unit should send merely over one data stream, the MIMO capable unit is set into a non MIMO mode utilizing a smaller overhead in the control signal instead of sending the more resource heavy MIMO overhead.

The process of switching modes may not only relate to switching between different MIMO modes but also between other modes of operation which are optimal with respect to, for example, reception performance and control signaling overhead, for different operating conditions, and where it is appropriate that base station decides about the mode switch since it has the best knowledge about the operating conditions. One example of this may be the switching between modes with different number of carriers in downlink and/or uplink in a system with multi-carrier support. Each carrier is using a different frequency to carry data.

Figure 8:
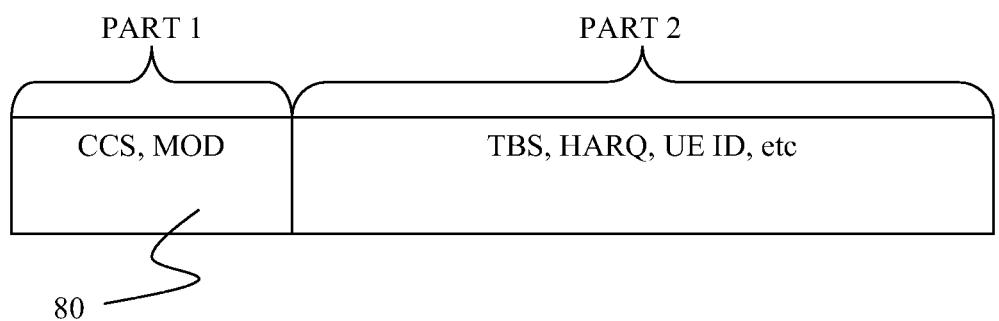
FIG. 8 shows a schematic overview of a HS-SCCH packet.

FIG. 8 discloses a schematic overview of a control signaling packet 80 wherein a first part comprises a modulation scheme info part indicating number of data streams used. In a 2×2 MIMO system with two modulation orders, five alternatives exist and 3 bits in the packet are dedicated to this part. For example, In case of QPSK and 16QAM, we have the following possibilities: (QPSK, -), (16QAM, -), (QPSK, QPSK), (16QAM, QPSK), (16QAM, 16QAM), where—indicate no data meaning single stream transmission. As the user equipment goes down into a non MIMO mode, the packets change format into a format comprising the modulation scheme info part of merely one bit. Hence, by putting the user equipment in a non MIMO mode, when MIMO function is limited, and thereby using merely one modulation bit in the control signaling one may require less transmission power for a certain error rate than for the MIMO type.

The packet further comprises 7 bits CCS, Channelization Code Set, multiplexed with the modulation scheme part and 2 bits precoding weight information, PWI. A second part comprises information concerning Transport block size info, TBS, Hybrid ARQ process ID, HARQ, Redundancy and constellation version info, RV, and UE-ID, of 28 bits. The HS-SCCH type for the non MIMO comprises a second part of 29 bits. Conclusively, when going from MIMO to non-MIMO, 2 modulation bits+2 PWI bits are excluded resulting in that part 1 contains 8 bits for non-MIMO, and 12 bits for MIMO. However, part 2 is one bit longer resulting in that the MIMO control signaling requires 3 more bits than non MIMO.

The order to inform the user equipment which MIMO mode a user equipment should configure to may be indicated using otherwise unused codewords on HS-SCCH. In an example, one unused sequence of the CCS field is used to indicate that this HS-SCCH is not a "normal" HS-SCCH, but rather contains an order. The actual order is placed in part 2, replacing for example the HARQ and RV bits, in total 6 bits.

The order from the base station may in an embodiment take one out of two values such as MIMO function on or MIMO function off. The order may in different embodiments indicate a plurality of modes, such as 2×2 MIMO mode, 4×4 MIMO mode and/or the like.

In the illustrated examples the MIMO order is based on received data from the user equipment. However, the base station may base the order on, for example, internal load of the base station, buffer status, load in a cell, channel rank estimation, SINR estimates, output levels, traffic toward/from a user or any other direct or indirect indicators of the usefulness of MIMO for the user equipment and/or network.

It should also be understood that by setting the user equipment in a non multiple modulated data streams capability mode or a limited mode one may reduce the required feedback bandwidth as the feedback data increases with the multiple modulated data streams function. For example, when MIMO is configured there can be HARQ ACK/NAK for two streams, meaning that there are 4 levels. For "normal" HSDPA only two levels are required (ACK or NAK). HS-DPCCH also contains CQI reports. In case of MIMO, there is a possibility to report two CQI, each 4 bit. In addition, there is also precoding control information, 2 bits. In total there is, consequently, 10 bits of CQI/PCI for dual stream and 5+2=7 bits for single stream. For non-MIMO operation, the CQI report is always 5 bits. The overhead may therefore in MIMO related UL control signaling be twice the size that of non-MIMO.

In the illustrated examples HSPA is used as the transmission technology, both downlink and uplink, but embodiments may also be applicable in other wireless systems, such as WiMAX, LTE or the like.

Embodiments disclose a method in a base station in a communications network for ordering a mode of multiple modulated data streams communication of a user equipment within the communications network comprising the steps of: determining the mode of multiple modulated data streams communication of the user equipment based on a parameter relating to the capacity of the communications network, and transmitting an order to user equipment indicating the determined mode of multiple modulated data streams communication.

Embodiments may further comprise the step of receiving data from the user equipment data.

The received data may comprise feedback data to the base station.

The data may be sent by performing a layer 1 or layer 2 signaling.

Embodiments disclose wherein the mode of multiple modulated data streams communication comprises a Multiple Input and Multiple Output mode.

Embodiments disclose wherein the mode of multiple modulated data streams communication comprises a multi carrier mode indicating number of carriers of data to be used during reception and/or transmission.

The parameter to determine the mode of multiple modulated data streams communication may comprise internal load of the base station, buffer status, load in a cell, radio propagation conditions, channel rank estimation, SINR estimates, output levels, traffic toward/from a user and/or any other direct and/or indirect indicators of the usefulness of a multiple modulated data streams mode for the user equipment or network.

In order to perform the method a base station is provided arranged to order a mode of multiple modulated data streams communication of a user equipment in a communications network, comprising transmitting arrangement and a control unit arranged to determine a mode of multiple modulated data streams communication of the user equipment based on a parameter relating to a capacity of the communications network, and to transmit over the transmitting arrangement an order to the user equipment indicating the determined mode of multiple modulated data streams communication of the user equipment.

Embodiments disclose a base station, wherein the mode of multiple modulated data streams communication comprises a multiple input multiple output mode.

Embodiments disclose a base station, wherein the order is transmitted in a control signaling over High Speed Shared Control Channel to the user equipment.

Embodiments disclose a base station that further comprises a receiving arrangement wherein the parameter to determine the mode of multiple modulated data streams communication of the user equipment comprises a downlink channel quality indicator received over High Speed Dedicated Physical Control Channel from the user equipment.

In addition, the base station may further comprise a receiving arrangement and the base station may be arranged to perform an evaluation process of data received over the receiving arrangement from the user equipment over an uplink channel and the parameter comprises in embodiments an indication of uplink channel quality from the evaluation process.

The mode of multiple modulated data streams may comprise a multi carrier mode indicating a number of carriers of different frequencies to be used during reception and/or transmission.

In embodiments the parameter to determine the mode of multiple modulated data streams communication of the user equipment comprises a resource situation of the base station.

In embodiments the parameter to determine the mode of multiple modulated data streams communication of the user equipment comprises the load of the cell or radio propagation conditions.

Furthermore, the base station may comprise a receiving arrangement arranged to receive a feedback transmission from the user equipment wherein the control unit is arranged to detect a present mode of multiple modulated data streams communication of the user equipment in the feedback transmission.

The base station may further be arranged to transmit the order periodically such that the user equipment stays in the determined mode of multiple modulated data streams communication.

Embodiments disclose a base station, wherein the order is indicated as at least one value in a part 1 of a control signaling packet from the base station and the order is arranged in a part 2 of the control signaling packet.

The mode of multiple modulated data streams communication may comprise mode of reception of signals and/or. mode of transmission of signals.

Embodiments disclose a method in a user equipment in a communications network comprising the steps of: receiving an order indicating a mode of multiple modulated data streams communication, and configuring the user equipment to operate in the indicated mode of multiple modulated data streams communication.

The user equipment further transmits a message acknowledging the reception of the order to be used in order, for example, to determine the parameter.

In order to perform a method in a user equipment a user equipment is provided comprising a receiving arrangement configured to receive an order from a base station, wherein the order comprises an indication of a mode of multiple modulated data streams communication, and a control unit arranged to configure the user equipment to operate in the mode of multiple modulated data streams communication indicated in the received order.

Embodiments further disclose a user equipment that further comprises a transmitting arrangement, wherein the control unit is arranged to transmit an acknowledgement of the received order using the transmitting arrangement to the base station.

In embodiments the control unit of the user equipment may further be arranged to perform a downlink channel estimation and to transmit an indication of the downlink channel quality using the transmitting arrangement ($243a$-$243k$) to the base station.

The user equipment may further be arranged to receive the order in a packet of a layer one control signaling.

Furthermore, a layer one control signal packet is disclosed containing at least a first bit indicating that the packet contains an order indicating a mode of multiple modulated data streams transmission, and at least a second bit indicating the mode of multiple modulated data streams transmission.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A base station arranged to command a mode of multiple modulated data streams communication of a user equipment in a High Speed Packet Access communication network, comprising:
a transmitting arrangement and a control unit arranged to determine a mode of multiple modulated data streams communication of the user equipment based on a parameter relating to a capacity of the communication network, wherein the mode comprises a Multiple Input and Multiple Output mode or a multi-carrier mode indicating a number of carriers of different frequencies to be used during reception and/or transmission, and to transmit via the transmitting arrangement a command to the user equipment that must be accepted to change to the determined mode of multiple modulated data streams communication of the user equipment, wherein the command is transmitted in a Layer-1 control signaling over a High Speed Shared Control Channel to the user equipment.

2. The base station of claim 1, further comprising a receiving arrangement, wherein the parameter to determine the mode of multiple modulated data streams communication of the user equipment comprises a downlink channel quality indicator received over High Speed Dedicated Physical Control Channel from the user equipment.

3. The base station of claim 1, further comprising a receiving arrangement, and the control unit is arranged to evaluate data received via the receiving arrangement from the user equipment over an uplink channel, and the parameter comprises an uplink channel quality indication based on evaluated data received.

4. The base station of claim 1, wherein the parameter comprises a resource situation of the base station or a load of the base station.

5. The base station of claim 1, further comprising a receiving arrangement arranged to receive a feedback transmission from the user equipment, wherein the control unit is arranged to detect a present mode of multiple modulated data streams communication of the user equipment in the feedback transmission.

6. The base station of claim 1, wherein the base station is arranged to transmit the command periodically such that the user equipment stays in the determined mode of multiple modulated data streams communication.

7. The base station of claim 1, wherein the command is indicated as at least one value in a part 1 of a control signaling packet from the base station and the command is arranged in a part 2 of the control signaling packet.

8. A user equipment in a High Speed Packet Access communication network, comprising:
 a receiving arrangement configured to receive a command in a Layer-1 control signaling over a High Speed Shared Control Channel from a base station to the user equipment, wherein the command must be accepted by the user equipment and comprises an indication of a mode of multiple modulated data streams communication, and the mode comprises a Multiple Input and Multiple Output mode or a multi-carrier mode indicating a number of carriers of different frequencies to be used during reception and/or transmission, and
 a control unit arranged to configure the user equipment to operate in the mode of multiple modulated data streams communication indicated in the received-command.

9. The user equipment of claim 8, further comprising a transmitting arrangement, wherein the control unit is arranged to transmit an acknowledgement of the received command via the transmitting arrangement to the base station.

10. The user equipment of claim 9, wherein the control unit is further arranged to perform a downlink channel estimation and to transmit an indication of downlink channel quality via the transmitting arrangement to the base station.

11. A method in a base station in a High Speed Packet Access communication network for commanding a mode of multiple modulated data streams communication of a user equipment within the communication network, comprising:
 determining the mode based on a parameter relating to a capacity of the communication network, wherein the mode comprises a Multiple Input and Multiple Output mode or a multi-carrier mode indicating a number of carriers of different frequencies to be used during reception and/or transmission, and
 transmitting, in a Layer-1 control signaling over a High Speed Shared Control Channel to the user equipment, a command that must be accepted by the user equipment to change to a determined mode.

12. The method of claim 11, further comprising receiving a downlink channel quality indicator over a High Speed Dedicated Physical Control Channel from the user equipment, wherein the parameter comprises the downlink channel quality indicator.

13. The method of claim 11, further comprising evaluating data received from the user equipment over an uplink channel, and the parameter comprises an uplink channel quality indicator based on evaluated data.

14. The method of claim 11, further comprising receiving a feedback transmission from the user equipment, and detecting a present mode of multiple modulated data streams communication of the user equipment based on the feedback transmission.

15. The method of claim 11, wherein the parameter comprises a resource situation of the base station or a load of the base station.

16. The method of claim 11, further comprising transmitting the command periodically such that the user equipment stays in the determined mode.

17. The method of claim 11, wherein the command is indicated as at least one value in a part 1 of a control signaling packet from the base station and the command is arranged in a part 2 of the control signaling packet.

18. A method in a user equipment in a High Speed Packet Access communication network, comprising:
 receiving a command, in a Layer-1 control signaling over a High Speed Shared Control Channel from a base station, that must be accepted by the user equipment to change of a mode of multiple modulated data streams communication, wherein the mode comprises a Multiple Input and Multiple Output mode or a multi-carrier mode indicating a number of carriers of different frequencies to be used during reception and/or transmission, and
 configuring the user equipment to operate in the mode indicated by the command.

19. The method of claim 18, further comprising transmitting, by the user equipment, a message acknowledging reception of the command indicating the mode.

20. The method of claim 18, further comprising performing a downlink channel estimation and transmitting an indication of downlink channel quality via the transmitting arrangement to the base station.

* * * * *